(12) United States Patent
Erbas (10) Patent No.: US 12,497,935 B2
(45) Date of Patent: Dec. 16, 2025

(54) TURBO PUMP DEVICE FOR ROCKET ENGINES

(71) Applicant: Timucin Erbas, Acton, MA (US)

(72) Inventor: Timucin Erbas, Acton, MA (US)

( * ) Notice: Subject to any disclaimer, the term of this patent is extended or adjusted under 35 U.S.C. 154(b) by 0 days.

(21) Appl. No.: 18/112,223

(22) Filed: Feb. 21, 2023

(65) Prior Publication Data

US 2023/0265815 A1    Aug. 24, 2023

Related U.S. Application Data

(60) Provisional application No. 63/312,887, filed on Feb. 23, 2022.

(51) Int. Cl.

| | |
|---|---|
| *F02K 9/46* | (2006.01) |
| *F01D 5/06* | (2006.01) |
| *F01D 5/08* | (2006.01) |
| *F01D 25/12* | (2006.01) |
| *F01D 25/14* | (2006.01) |
| *F02K 9/44* | (2006.01) |
| *F02K 9/48* | (2006.01) |
| *F02K 9/60* | (2006.01) |

(52) U.S. Cl.
CPC ................ *F02K 9/46* (2013.01); *F01D 5/06* (2013.01); *F01D 5/08* (2013.01); *F01D 5/082* (2013.01); *F01D 25/12* (2013.01); *F01D 25/125* (2013.01); *F01D 25/14* (2013.01); *F02K 9/44* (2013.01); *F02K 9/48* (2013.01); *F02K 9/60* (2013.01); *F02K 9/605* (2013.01)

(58) Field of Classification Search
CPC ..... F02K 9/44; F02K 9/46; F02K 9/60; F02K 9/605; F02K 9/48; F01D 5/08; F01D 5/06; F01D 5/082; F01D 25/12; F01D 25/125; F01D 25/14
See application file for complete search history.

(56) References Cited

U.S. PATENT DOCUMENTS

| | | | |
|---|---|---|---|
| 8,864,441 B1 * | 10/2014 | Pinera ................ | F04D 1/06 415/105 |
| 10,570,777 B2 * | 2/2020 | Bowan ................ | F04D 29/0413 |
| 2016/0222919 A1 * | 8/2016 | Maeding ............. | F02K 9/425 |

(Continued)

OTHER PUBLICATIONS

Erbas, "Causes of Engine Complexity," Medium, Medium, Feb. 2022, https://timucin1erbas.medium.com/causes-of-engine-complexity-patent-article-ii-9c8063da982b.

(Continued)

*Primary Examiner* — Kyle Robert Thomas
(74) *Attorney, Agent, or Firm* — Cesari and McKenna, LLP; Steven M. Mills (57) ABSTRACT

An example turbo-pump for a rocket is provided. The example turbo-pump includes a turbine. A first chamber, coupled to the turbine, receives oxidizer fluid resulting in the oxidizer fluid leaving the first chamber at a faster rate to a reaction chamber. A select amount of the oxidizer fluid enters the turbine. A second chamber, coupled to the turbine, receives fuel resulting in the fuel leaving the second chamber at a faster rate to the reaction chamber. A select amount of the fuel enters the turbine. A plurality of pipes is positioned around the turbine. The plurality of pipes is configured to distribute cooling fluid around the turbine to lower the kinetic energy of the select amount of the fuel and the oxidizer fluid within the turbine.

22 Claims, 6 Drawing Sheets

(56) References Cited

U.S. PATENT DOCUMENTS

2019/0032605 A1* 1/2019 Sakaguchi ................ F02K 9/95
2020/0300197 A1* 9/2020 Duri ...................... F04D 29/588

OTHER PUBLICATIONS

Erbas, "Halving Turbo Pump Costs via Seal Simplifications," Medium, Medium, Mar. 2022, https://timucin1erbas.medium.com/halving-turbo-pump-costs-via-seal-simplifications-33bd63912762.

Erbas, "Money Pits in Rocket Production," Medium, Medium, Feb. 2022, https://timucin1erbas.medium.com/money-pits-in-rocket-production-patent-article-i-9e7317d009a.

Erbas, "Replacing the Current Shaft Seal," Medium, Medium, Feb. 2022, https://timucin 1erbas.medium.com/replacing-the-current-shaft-seal-patent-article-iii-acbea1ae843d.

* cited by examiner

TURBO PUMP DEVICE FOR ROCKET ENGINES

RELATED APPLICATIONS

This application claims priority to U.S. provisional application No. 63/312,887 filed on Feb. 23, 2022, the contents of which is included herein in its entirety.

BACKGROUND

A typical turbo-pump utilizes a turbo-pump shaft seal to allow fuel to be delivered to the reaction chamber of a rocket engine. The turbo-pump shaft seal includes a series of seals, each reducing the gas leakage rather than a single seal. It is common for a turbo-pump shaft seal to include over 200 parts to implement the series of seals. Along with the fact that each of these 200 parts has to traverse the supply chain individually, it is also essential to keep in mind that each of these seals requires a lot of testing before being driven into production. Moreover, eighty percent of the cost of producing turbo-pumps is directly influenced by the number of parts due to testing and supply chain expenses. This requires reducing the number of parts of turbo-pumps to drive down costs.

SUMMARY

An example turbo-pump for a rocket includes a turbine. A first chamber, coupled to the turbine, receives oxidizer fluid resulting in the oxidizer fluid leaving the first chamber at a faster rate to a reaction chamber. A select amount of the oxidizer fluid enters the turbine. A second chamber, coupled to the turbine, receives fuel resulting in the fuel leaving the second chamber at a faster rate to the reaction chamber. A select amount of the fuel enters the turbine. A plurality of pipes is positioned around the turbine. The plurality of pipes is configured to distribute cooling fluid around the turbine to lower the kinetic energy of the select amount of the fuel and the oxidizer fluid within the turbine.

In this example turbo-pump, the turbine may include at least one blade in the first chamber for spinning the turbine. The turbine may include at least one blade in the second chamber for spinning the turbine. The plurality of pipes may include pipes of varying diameters. The plurality of pipes may be configured to provide maximum cooling across a surface area of the turbine. The turbine may be shaped for maximum cooling by the plurality of pipes. The plurality of pipes may be coupled to at least one first circular pipe for receiving the cooling fluid. The plurality of pipes may be coupled to at least one second circular pipe for removing the cooling fluid.

An example method for performing the operations of a turbo-pump for a rocket is provided. The method includes: providing a turbine; receiving oxidizer fluid into a first chamber, resulting in the oxidizer fluid leaving the first chamber at a faster rate, wherein a select amount of the oxidizer fluid enters the turbine; receiving fuel into a second chamber, resulting in the fuel leaving the second chamber at a faster rate to the reaction chamber, wherein a select amount of the fuel enters the turbine; and positioning a plurality of pipes around the turbine, the plurality of pipes configured to distribute cooling fluid around the turbine to lower the kinetic energy of the select amount of the fuel and the oxidizer fluid within the turbine.

In this example method, the turbine may include at least one blade in the first chamber for spinning the turbine. The turbine may include at least one blade in the second chamber for spinning the turbine. The plurality of pipes may include pipes of varying diameters. The plurality of pipes may be configured to provide maximum cooling across a surface area of the turbine. The turbine may be shaped for maximum cooling by the plurality of pipes. The plurality of pipes may be coupled to at least one first circular pipe for receiving the cooling fluid. The plurality of pipes may be coupled to at least one second circular pipe for removing the cooling fluid.

An example turbo-pump for a rocket that includes a turbine. A first chamber, coupled to the turbine, receives oxidizer fluid resulting in the oxidizer fluid leaving the first chamber at a faster rate to a reaction chamber. A select amount of the oxidizer fluid enters the turbine. A second chamber, coupled to the turbine, receives fuel resulting in the fuel leaving the second chamber at a faster rate to the reaction chamber. A select amount of the fuel enters the turbine. A plurality of pipes is positioned around the turbine. The plurality of pipes is configured to distribute cooling fluid around the turbine to lower the kinetic energy of the select amount of the fuel and the oxidizer fluid within the turbine. At least one outlet is coupled to the turbine. The at least one outlet is configured to allow a certain amount of fuel and the oxidizer fluid within the turbine to pass thru the at least one outlet to prevent dangerous pressure imbalances in the turbine.

In this example turbo-pump, the at least one outlet may extend from the turbine to an outer peripheral surface of the turbo-pump. The at least one outlet may wrap the peripheral surface of the turbo-pump. The at least one outlet may be coupled to a different pipe for removing the fuel and the oxidizer fluid from the turbine. The different pipe may be positioned external to the turbo-engine. One of the plurality of pipes may include a section positioned above the outer peripheral surface of the turbo-engine to facilitate the at least one outlet.

Additional features and advantages of the present disclosure is described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

The disclosure addresses the deficiencies of turbo-pumps used in rocket engines. In particular, the disclosure describes one or more turbo-pump designs that replace purge seals. Moreover, the turbo-pumps described herein do not require keeping the reactants separate, allowing both fuel and oxidizer to interact, but their reactivity has been disabled. Using the turbo-pumps described herein would lead to a cost-effective alternative that is easy to implement.

Figure 1:
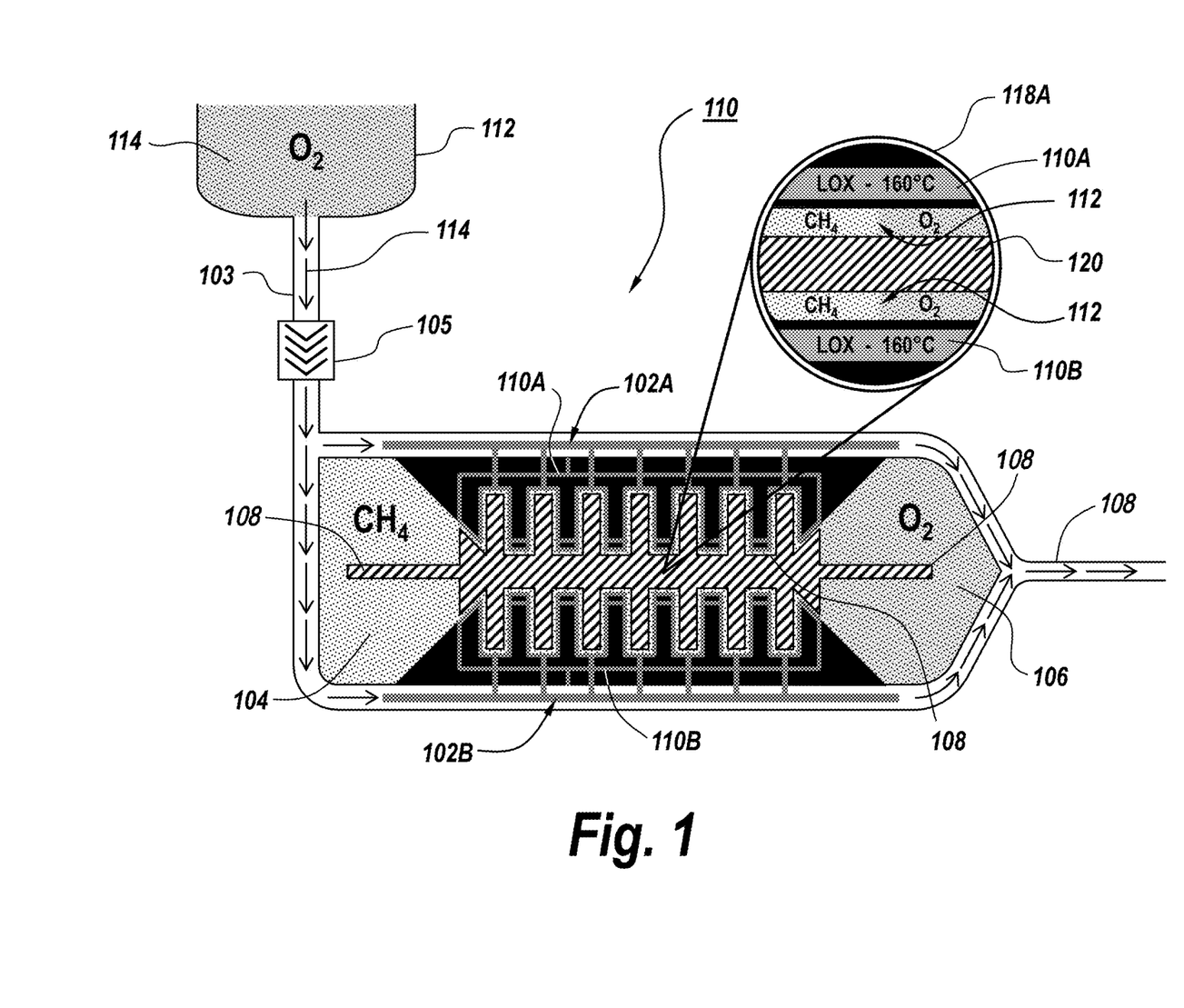
FIG. 1 is a schematic diagram of an example turbo-pump.

FIG. 1 is a schematic diagram of an example turbo-pump 100. Turbo-pump 100 includes a first set of capillary pipes 102A and 102B, first chamber 106, valve 105, second chamber 104, turbine 108, and a second set of capillary pipes 110A and 110B. Moreover, turbo-pump 100 is connected to a tank 112 via main pipe 103. Tank 112 may store cooling fluid, such as liquid oxygen (LOX) 114, that flow into main pipe 103 into turbo-pump 100. Other types of cooling fluid may be used, such as liquid nitrogen, liquid hydrogen, or other liquids that lowers the activation temperature between the rocket fuel and an oxidizer fluid.

Valve 105 is configured to control the flow of LOX 114 to ensure that LOX 114 only flows through main pipe 103 and no flow returns into oxygen tank 112. Moreover, valve 105 may control the amount of LOX 114 received at turbo-pump 100 via main pipe 103. Valve 105 may be a control valve or a manual valve. In some implementations, valve 105 may be controlled by a control unit or one or more computer systems.

Turbine 108 may be coupled to first chamber 106 and second chamber 104. A pre-burning process, using one or more pre-burners, may be used to spin the turbine 108. Any pre-burning process may be used to initiate spinning turbine 108. Turbine 108 may include aluminum alloys, stainless steels, high-strength steels, nickel base alloys, cobalt base alloys, titanium, and the like.

A first chamber 106 receives an oxidizer fluid, such as liquid oxygen, from a source within the rocket system or external the rocket system. Other types of oxidize fluid may be used, such as hydrogen peroxide, nitric acid, nitrate solutions, and the like. As more oxidizer fluid is received in first chamber 106, the flow rate of the oxidizer fluid exiting first chamber 106 into a reaction chamber increases due to the spinning turbine 108. A select amount of oxidizer fluid from first chamber 106 enters turbine 108. The first chamber 106 may include aluminum alloys, stainless steels, high-strength steels, nickel base alloys, cobalt base alloys, titanium, and the like. In one example, first chamber 106 may receive as oxidizer fluid the liquid oxygen from tank 112. In another example, first chamber 106 may receive oxidizer fluid from a source different from the cooling fluid.

Second chamber 104 receives fuel, such as methane or the like, while turbine 108 spins in the second chamber 104. As more fuel is received in second chamber 104, this increases the flow rate of the fuel exiting second chamber 104 into the reaction chamber. A select amount of fuel from second chamber 104 enters turbine 108. The second chamber 104 may include aluminum alloys, stainless steels, high-strength steels, nickel base alloys, cobalt base alloys, titanium, and the like.

The first set of capillary pipes 102A and 102B receive LOX 114 from main pipe 103. Capillary pipes 102A and 102B may each connect to second set of capillary pipes 110A and 110B. In this case, capillary pipe 102A connects to capillary pipe 110A, and capillary pipe 102B connects to capillary pipe 110B. Each capillary pipe 110A and 110B may be arranged to cover a significant amount of surface area of turbine 108. Capillary pipes 110A and 110B may be arranged differently from each other to maximize the coverage of the surface area of turbine 108. Using the cooled LOX 114, capillary pipes 110A and 110B may prevent the reaction of the fuel and the liquid oxygen in turbine 108.

Turbine 108 may be shaped for maximum cooling by capillary pipes 102A, 102B, 110A, and 110B. In this implementation, turbine 108 has a zigzag shape but other shapes may be used as well.

Capillary pipes 102A and 102B may have diameters smaller than the diameter of main pipe 103. The diameters of capillary pipes 110A and 110B may be smaller than those of capillary pipes 102A and 102B. Capillary pipes 102A, 102B, 110A, and 110B may include aluminum alloys, stainless steels, high-strength steels, nickel base alloys, cobalt base alloys, titanium, and the like.

Inert 118 shows an interior region of turbine 108. Within turbine 108 is shaft 120. Positioned on two sides of shaft 120 are fluids comprising the fuel from second chamber 104 and liquid oxygen from first chamber 106. Capillary pipes 102A, 102B, 110A, and 110B are configured to decrease the kinetic energy at reaction points 122 resulting in the fuel from second chamber 104 and liquid oxygen from first chamber 106 not reacting and causing an explosive reaction.

Once LOX 114 fully traverses the length of capillary pipes 110A and/or 110B, LOX 114 may be returned to capillary pipe 102A and/or 102B for exiting turbo-pump 100 via pipe 124. In this case, LOX 114 in pipe 124 may be warmer compared to when it was in oxygen tank 112. This is due to the heat exchange between LOX 114 and turbine 108 to decrease the kinetic energy at reaction points 122.

In some implementations, the warm LOX 114 in pipe 124 may be piped into a reaction chamber or used for other purposes. The effects of the usage of the output are not very significant compared to the amount of liquid oxygen used as propellant.

Turbo-pump 100 is designed not to require purge seals typically used in other turbo-pumps. In particular, the arrangement of capillary pipes 102A, 102B, 110A, and 110B allows for containing the kinetic interactions between the fuel and liquid oxygen within turbine 108 without requiring purge seals. The elimination of purge seals lowers the number of components needed for turbo-pump 100 as well as makes the design of turbo-pump 100 more compact.

Figure 2A:
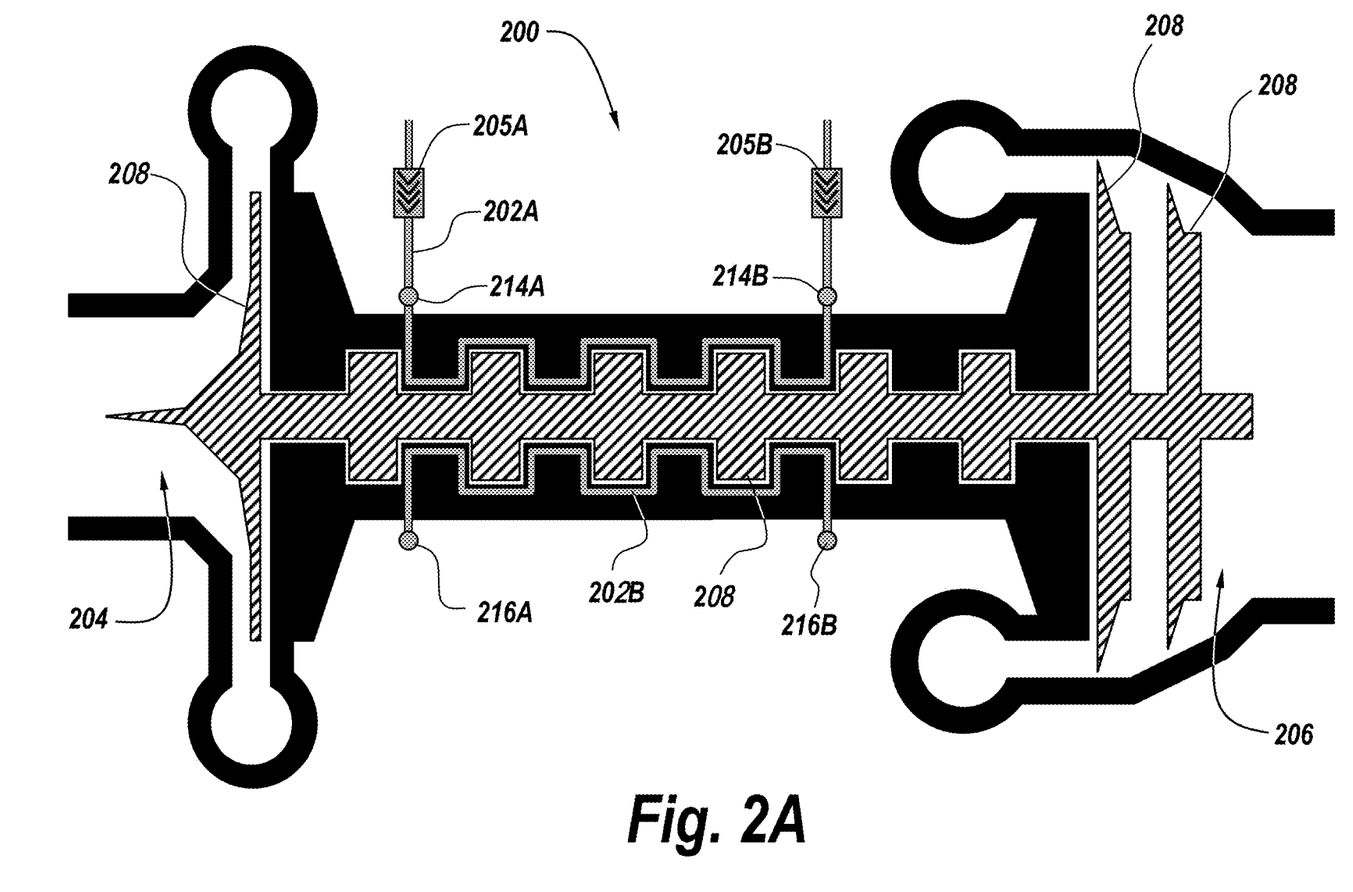
FIGS. 2A-2B are schematic diagrams of another example turbo-pump.
Figure 2B:
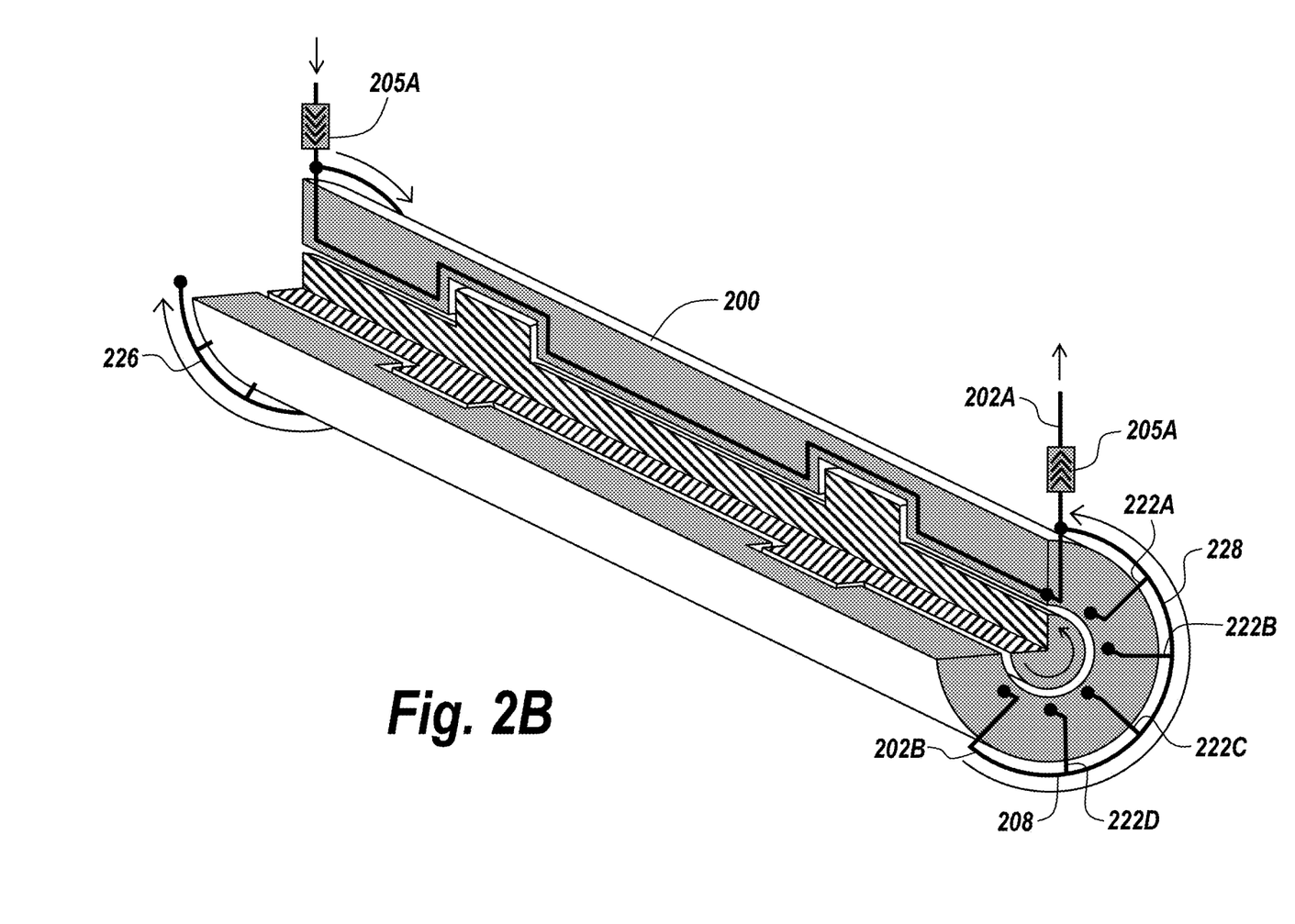

FIGS. 2A-2B are schematic diagrams of an example turbo-pump 200. In particular, FIG. 2A shows turbo-pump 200 having a first set of pipes 202A and 202B, second chamber 204, valves 205A and 205B, first chamber 206, and turbine 208. Pipe 202A first receives a cooling fluid, such as cooled LOX, from either an internal storage tank or some external source. Other types of cooling fluid may be used, such as liquid nitrogen, liquid hydrogen, or other liquids that lowers the activation temperature between the rocket fuel and an oxidizer fluid.

Valves 205A and 205B are configured to direct the flow of the cooling fluid to ensure that the cooling fluid only flows through pipes 202A and 202B with no return flow. Moreover, valves 205A and 205B may control the amount of and flow of the cooling fluid used for heat exchange between pipes 202A and 202B and turbine 208. Valves 205A and 205B may be control valves or manual valves. In some implementations, valves 205A and 205B may be controlled by a control unit or one or more computer systems.

Turbine 208 may be coupled to first chamber 206 and second chamber 204. A pre-burning process, using one or more pre-burners, may be used to spin the turbine 208. Any pre-burning process may be used to initiate spinning of turbine 208. Turbine 208 may include aluminum alloys, stainless steels, high-strength steels, nickel base alloys, cobalt base alloys, titanium, and the like.

First chamber 206 receives oxidizer fluid, such as liquid oxygen, from a source within the rocket system or external the rocket system. Other types of oxidizer fluid may be used, such as hydrogen peroxide, nitric acid, nitrate solutions, and the like. As more oxidizer fluid is received in first chamber 206, this increases the flow rate of the oxidizer fluid exiting first chamber 206 into a reaction chamber due to the spinning turbine 208. A select amount of the oxidizer fluid from second chamber 206 enters turbine 208. The second chamber 206 may include aluminum alloys, stainless steels, high-strength steels, nickel base alloys, cobalt base alloys, titanium, and the like. In one example, first chamber 206 may receive oxidizer fluid from the same source as the cooling liquid. In another example, first chamber 206 may receive oxidizer fluid from a source different from the cooling fluid.

Second chamber 204 receives fuel, such as methane or the like, while turbine 208 spins in the second chamber 204. As more fuel is received in second chamber 204, this increases the flow rate of the fuel exiting second chamber 204 into the reaction chamber. A select amount of fuel from second chamber 204 enters turbine 208. The second chamber 204 may include aluminum alloys, stainless steels, high-strength steels, nickel base alloys, cobalt base alloys, titanium, and the like.

Each pipe 202A and 202B may cover a significant amount of the surface area of turbine 208. Pipes 202A and 202B may be arranged differently from each other to maximize the surface area coverage of turbine 208. Using the cooling fluid, pipes 202A and 202B may cool turbine 208 to prevent the reaction of the fuel and the oxidizer fluid in turbine 208. Pipe 202B may extend outwardly from and circumferentially around turbo-pump 200 at points 214A and 214B to connect with pipe 202A at points 216A and 216B. At point 214A, a select amount of the cooling fluid received at pipe 202A may be sent to point 216A of pipe 202B to cool turbine 208. At point 216B, the cooling fluid is sent to point 214B of pipe 202A for exiting turbo-pump 200 via valve 205B. There may be a varying number of pipes used besides those shown herein.

Turbine 208 is shaped for maximum cooling by pipes 202A and 202B. In this implementation, turbine 208 has a zigzag shape but other shapes may be used as well.

Once the cooling fluid fully traverses pipes 202A and/or 202B, the cooling fluid may exit turbo-pump 200 via using valve 205B. In this case, the cooling fluid in pipe 202A or 202B may be warmer than when it was first received at pipe 202A. This is due to the heat exchange between the cooling fluid in pipes 202A and/or 202B and turbine 208 to decrease the kinetic energy at reaction points in turbine 208.

In some implementations, the warm cooling fluid may be piped into a reaction chamber or used for other purposes. The effects of the usage of the output are insignificant compared to the amount of oxidizer fluid used as propellant.

FIG. 2B is a perspective view of turbo-pump 200. Turbo-pump 200 includes pipes 202A-202B and additional pipes 222A-22D for cooling turbine 208 as described herein. Each pipe 202A-202B and 222A-222D extends horizontally and internally thru the length of turbo-pump 200. Pipes 202A-202B and 222A-222D are configured to provide maximum cooling of turbine 208. In this implementation, pipes 202A-202B and 222A-222D are circularly arranged around turbine 208 for cooling. Other arrangements of pipes 202A-202B and 222A-222D may be used. Pipes 202A-202B and 222A-222D are each connected to circular ends 226 and 228. Circular pipes 226 and 228 are each connected to a different end of pipe 202A.

A certain amount of the cooling fluid received at pipe 202A may be piped into circular pipe 226, allowing the distribution of the cooling fluid to reach each pipe 202B and 222A-222D for cooling turbine 208. Once the cooling fluid n each pipe 202B and 222A-222D traverses the length of each pipe, the cooling fluid of each pipe is received at circular pipe 228, which is directed to pipe 202A for exiting via valve 205B.

Turbo-pump 200 is designed not to require purge seals typically used in other turbo-pumps. In particular, the arrangement of capillary pipes 202A, 202B, and 222A-222D allows for containing the kinetic interactions between the fluid and oxidizer fluid within turbine 108 without requiring purge seals. The elimination of purge seals lowers the number of components needed for turbo-pump 200 as well as makes the design of turbo-pump 100 more compact.

Figure 3A:
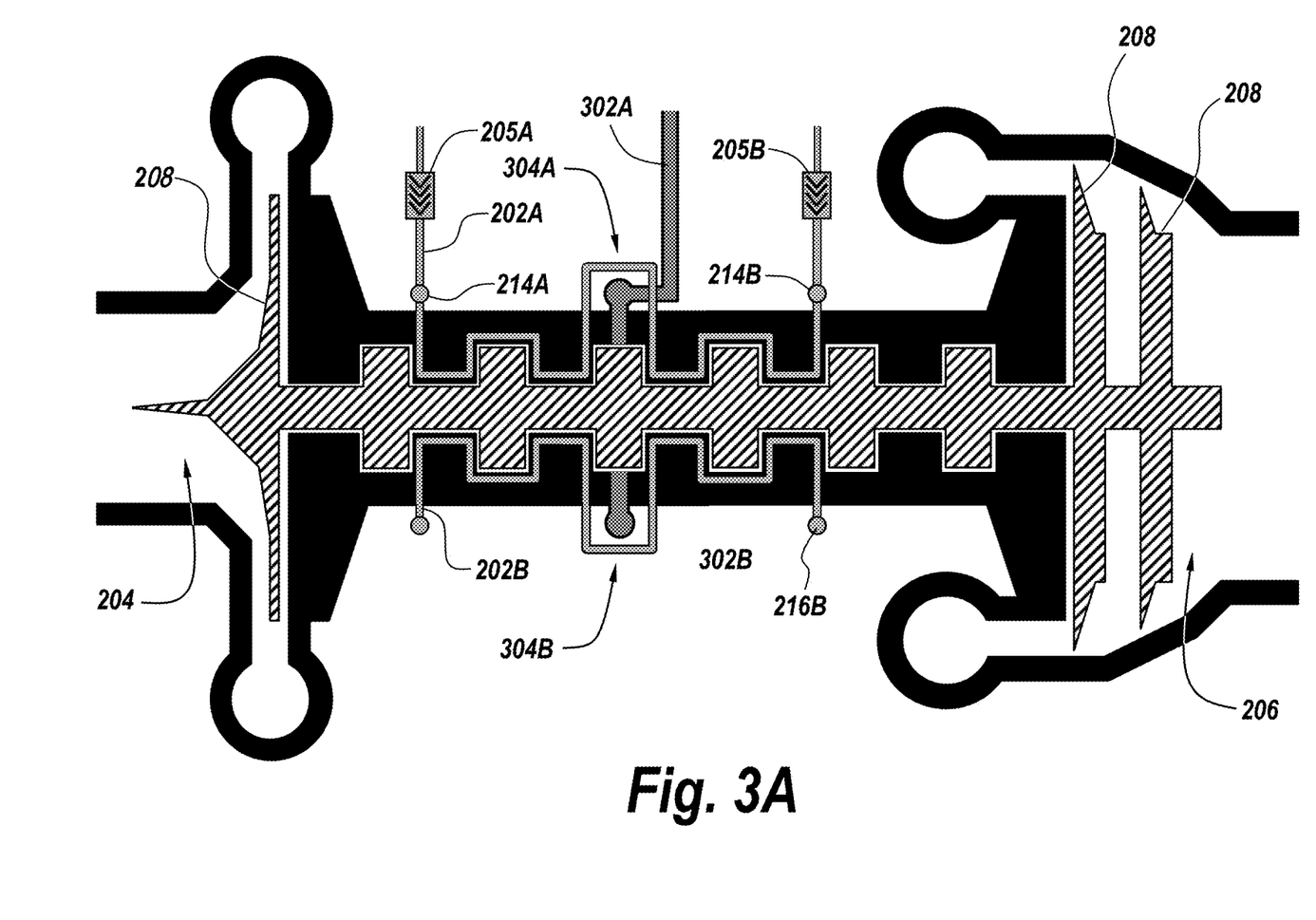
FIGS. 3A-3B are schematic diagrams of a turbo-pump having one or more outlets.
Figure 3B:
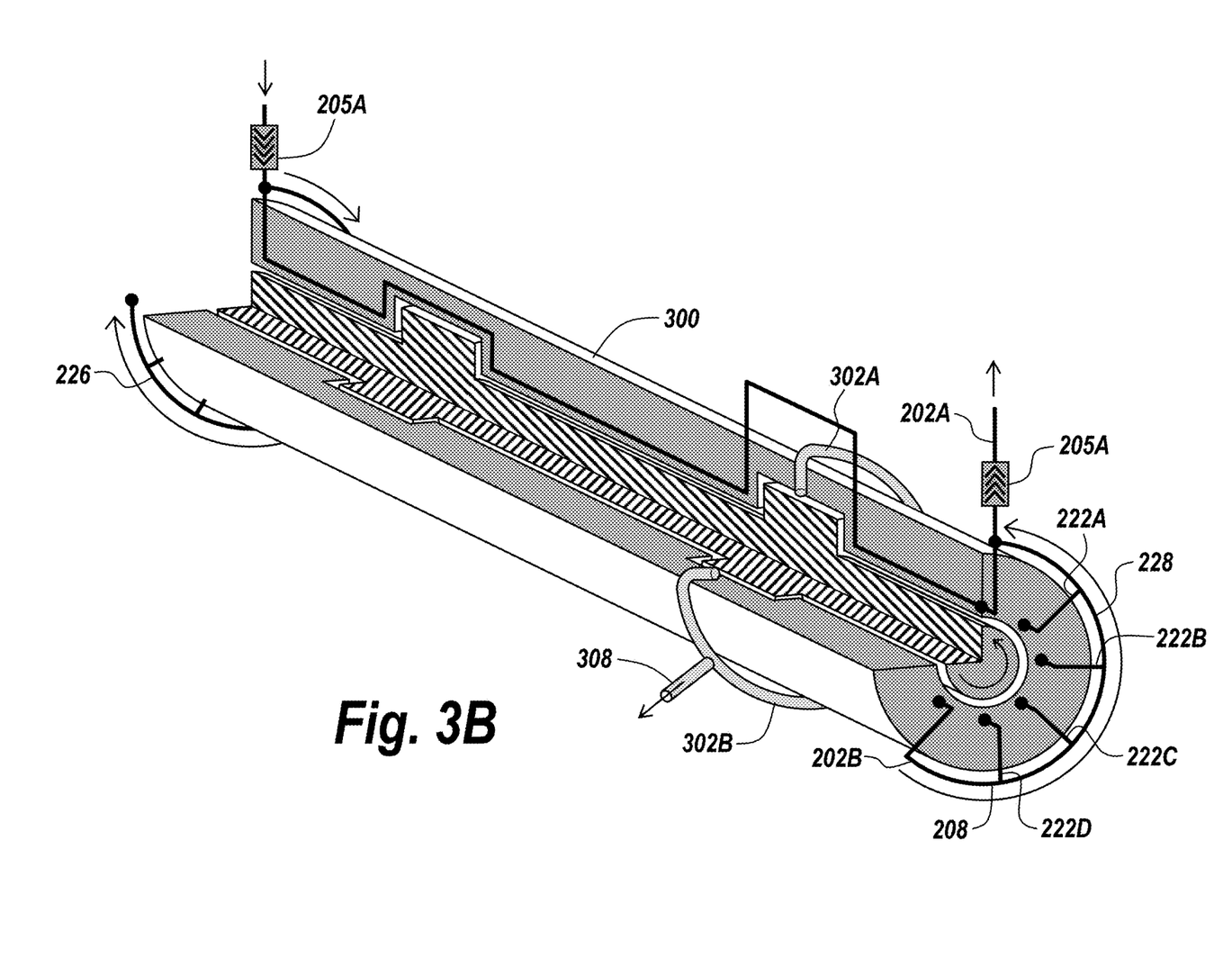

FIGS. 3A-3B are schematic diagrams of a turbo-pump engine 300 having one or more outlets. Turbo-pump 300 includes a similar arrangement as turbo-pump 200 in FIG. 2. In this case, identical reference numberings are used in FIG. 3 as in FIG. 2 to describe similar components. Under certain conditions, either the fuel in second chamber 204 or the oxidizer fluid in first chamber 206 may produce a pressure imbalance in turbine 208, resulting in possible dangerous kinetic conditions between the fuel and oxidizer fuel. To resolve these dangerous kinetic conditions, one needs to balance the pressure in turbine 208.

FIG. 3A shows turbo-pump 300 having outlets 302A and 302B connected on different sides of turbine 208. The outlets 302A and 302B may be used to balance the pressure in turbine 208 by releasing a select amount of propellant fluid (fuel and oxidizer fluid) in turbine 208 for proper pressure maintenance. To facilitate outlets 302A and 302B in turbo-pump 300, a portion 304A of pipe 202A is extended both upwards above outlet 302A and externally from turbo-pump 300, and a portion 304B of pipe 202B is extended upwards both above outlet 302B and externally from turbo-pump 300. The propellant fluid in outlets 302A and 302B is sent to an external outlet 308, described further in FIG. 3B, positioned externally of turbo-pump 300. Outlets 302A and 302B may include aluminum alloys, stainless steels, high-strength steels, nickel base alloys, cobalt base alloys, titanium, and the like.

FIG. 3B shows a perspective view of turbo-pump 300. In particular, outlets 302A and 302B may extend to the outer peripheral surface of turbo-pump 300. Moreover, outlets 302A and 302B may extend a certain distance around the peripheral surface of turbo-pump 300 to connect to external outlet 308. External outlet 308 receives the propellant fluid received from outlets 302A and 302B for removal. In some cases, external outlet 308 may connect to other external pipes to remove propellant fluid from turbo-pump 300. External outlet 308 may send the propellant fluid to a reaction chamber. External outlet 308 may include aluminum alloys, stainless steels, high-strength steels, nickel base alloys, cobalt base alloys, titanium, and the like.

Figure 4:
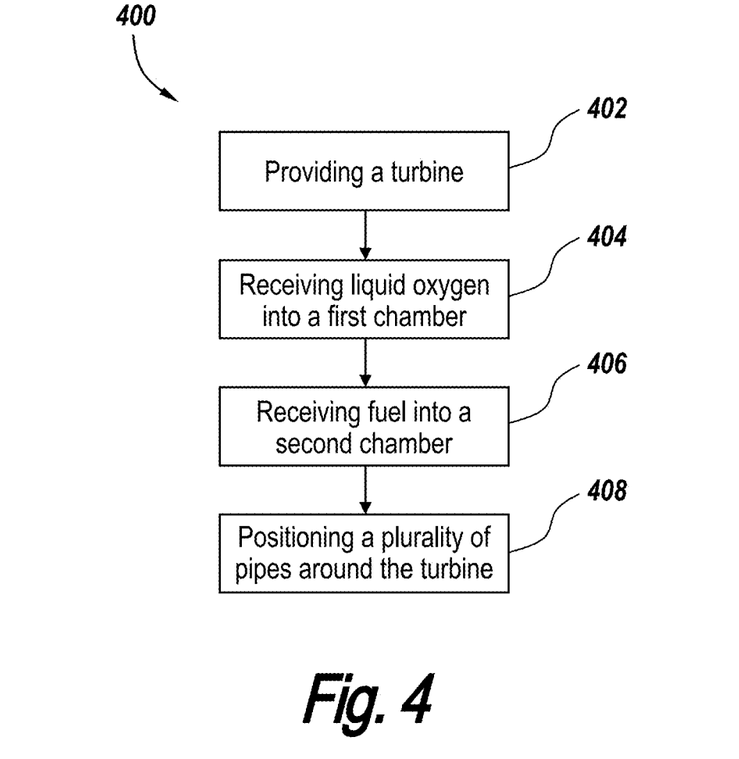
FIG. 4 is a process flowgraph of an example process for performing the operations of a turbo-pump for a rocket.

FIG. 4 is a process flowgraph of an example process 400 for performing the operations of a turbo-pump for a rocket. Process 400 includes providing (402) a turbine (such as turbine 108 and 208). Process 400 includes receiving (404) oxidizer fluid (such as liquid oxygen and the like) into a first chamber (such as first chamber 106 and 206), resulting in the oxidizer fluid leaving the first chamber at a faster rate to a reaction chamber. A select amount of the oxidizer fluid enters the turbine. Also, process 400 includes receiving (406) fuel (such as methane and the like) into a second chamber (such as second chamber 104 and 204), resulting in the fuel leaving the second chamber at a faster rate to the reaction chamber. A select amount of the fluid enters the turbine. Furthermore, process 400 includes positioning (408) a plurality of pipes (pipes 102A, 102B, 110A, 110B, 202A, 202B, 222A-222D) around the turbine. The plurality of pipes is configured to distribute cooling fluid (such as LOX 114) around the turbine to lower the kinetic energy of the select amount of the fuel and the oxidizer fluid within the turbine.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A turbo-pump for a rocket comprising:
   a turbo-pump casing;
   a turbine within the casing configured to receive an oxidizer fluid and fuel;
   a first chamber within the casing, coupled to the turbine, for receiving the oxidizer fluid, resulting in the oxidizer fluid leaving the first chamber at a faster rate to a reaction chamber, wherein a select amount of the oxidizer fluid enters the turbine;
   a second chamber within the casing, coupled to the turbine, for receiving the fuel, the fuel leaving the second chamber at a faster rate to the reaction chamber, wherein a select amount of the fuel enters the turbine;
   wherein the turbo-pump casing surrounds an intermediate region of a shaft of the turbo-pump between the first chamber and the second chamber;
   a plurality of capillary pipe inlets disposed in the turbo-pump casing surrounding the intermediate region;
   a plurality of capillary pipe outlets disposed in the turbo-pump casing surrounding the intermediate region; and
   a plurality of capillary pipes, wherein each capillary pipe of the plurality of capillary pipes extend entirely within the turbo-pump casing surrounding the intermediate region and external to the turbine from a respective capillary pipe inlet to a respective capillary pipe outlet, the plurality of capillary pipes being configured to distribute cooling fluid external to the turbine to prevent a reaction between the select amount of the fuel and the oxidizer fluid within the turbine.

2. The turbo-pump of claim 1, wherein the turbine comprises at least one blade in the first chamber for spinning the turbine to control a flow of the oxidizer fluid exiting the first chamber.

3. The turbo-pump of claim 1, wherein the turbine comprises at least one blade in the second chamber for spinning the turbine to control a flow of the fuel exiting the second chamber.

4. The turbo-pump of claim 1, wherein the plurality of capillary pipes comprises pipes of varying diameters.

5. The turbo-pump of claim 1, wherein the plurality of capillary pipes are configured to provide cooling across a surface area of the turbine.

6. The turbo-pump of claim 1, wherein the turbine is shaped for cooling by the plurality of capillary pipes.

7. The turbo-pump of claim 1, wherein the plurality of capillary pipes are coupled to at least one first circular pipe for receiving the cooling fluid.

8. The turbo-pump of claim 7, wherein the plurality of capillary pipes are coupled to at least one second circular pipe for removing the cooling fluid.

9. A method for performing operations of a turbo-pump for a rocket, the method comprising:
   providing a turbo-pump casing;
   providing a turbine within the casing configured to receive an oxidizer fluid and a fuel;
   receiving the oxidizer fluid into a first chamber within the casing, the oxidizer fluid leaving the first chamber at a faster rate, wherein a select amount of the oxidizer fluid enters the turbine;
   receiving the fuel into a second chamber within the casing, the fuel leaving the second chamber at a faster rate to a reaction chamber, wherein a select amount of the fuel enters the turbine; and wherein the turbo-pump casing surrounds an intermediate region of a shaft of the turbo-pump between the first chamber and the second chamber;
positioning a plurality of capillary pipe inlets disposed in the turbo-pump casing surrounding the intermediate region;
positioning a plurality of capillary pipe outlets disposed in the turbo-pump casing surrounding the intermediate region; and
positioning a plurality of capillary pipes within the turbo-pump casing and external to the turbine such that each capillary pipe of the plurality of capillary pipes extend entirely within the turbo-pump casing surrounding the intermediate region from a respective capillary pipe inlet to a respective capillary pipe outlet, the plurality of capillary pipes being configured to distribute cooling fluid external to the turbine to prevent a reaction between the select amount of the fuel and the oxidizer fluid within the turbine.

10. The method of claim 9, wherein the turbine comprises at least one blade in the first chamber for spinning the turbine to control a flow of the oxidizer fluid exiting the first chamber.

11. The method of claim 9, wherein the turbine comprises at least one blade in the second chamber for spinning the turbine to control a flow of the fuel exiting the second chamber.

12. The method of claim 9, wherein the plurality of capillary pipes comprises pipes of varying diameters.

13. The method of claim 9, wherein the plurality of capillary pipes is configured to provide cooling across a surface area of the turbine.

14. The method of claim 9, wherein the turbine is shaped for cooling by the plurality of capillary pipes.

15. The method of claim 9, wherein positioning the plurality of capillary pipes comprises coupling the plurality of capillary pipes to at least one first circular pipe for receiving the cooling fluid.

16. The method of claim 15, wherein positioning the plurality of capillary pipes comprises coupling the plurality of capillary pipes to at least one second circular pipe for removing the cooling fluid.

17. A turbo-pump for a rocket comprising:
a turbo-pump casing;
a turbine within the casing configured to receive an oxidizer fluid and a fuel;
a first chamber within the casing, coupled to the turbine, for receiving oxidizer fluid, the oxidizer fluid leaving the first chamber at a faster rate to a reaction chamber, wherein a select amount of the oxidizer fluid enters the turbine;
a second chamber within the casing, coupled to the turbine, for receiving fuel, the fuel leaving the second chamber at a faster rate to the reaction chamber, wherein a select amount of the fuel enters the turbine;
wherein the turbo-pump casing surrounds an intermediate region of a shaft of the turbo-pump between the first chamber and the second chamber;
a plurality of capillary pipe inlets disposed in the turbo-pump casing surrounding the intermediate region;
a plurality of capillary pipe outlets disposed in the turbo-pump casing surrounding the intermediate region; and
a plurality of capillary pipes, wherein each capillary pipe of the plurality of capillary pipes extend entirely within the turbo-pump casing surrounding the intermediate region and external to the turbine from a respective capillary pipe inlet to a respective capillary pipe outlet, the plurality of capillary pipes being configured to distribute cooling fluid external to the turbine to prevent a reaction between the select amount of the fuel and the oxidizer fluid within the turbine; and
at least one outlet coupled to the turbine, the at least one outlet configured to allow a certain amount of the fuel and the oxidizer fluid within the turbine to pass thru the at least one outlet to prevent dangerous pressure imbalances in the turbine.

18. The turbo-pump of claim 17, wherein the at least one outlet extends from the turbine to an outer peripheral surface of the turbo-pump.

19. The turbo-pump of claim 18, wherein the at least one outlet wraps the peripheral surface of the turbo-pump.

20. The turbo-pump of claim 18, wherein the at least one outlet is coupled to a different pipe for removing a fluid and the oxidizer fluid from the turbine.

21. The turbo-pump of claim 20, wherein the different pipe is positioned external to the turbo-pump.

22. The turbo-pump of claim 18, wherein one of the plurality of capillary pipes comprises a section positioned above the outer peripheral surface of the turbo-pump to facilitate the at least one outlet.

* * * * *